US006213798B1

United States Patent
Kawamura et al.

(10) Patent No.: US 6,213,798 B1
(45) Date of Patent: Apr. 10, 2001

(54) ROTARY CONNECTOR CAPABLE OF EASY AND RELIABLE RE-LOCKING OF MOVABLE HOUSING IN NEUTRAL POSITION OF ROTATION AFTER ROTATION TEST

(75) Inventors: Kazuya Kawamura; Nobuo Matsuzaki, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/525,162

(22) Filed: Mar. 14, 2000

(30) Foreign Application Priority Data

Mar. 17, 1999 (JP) .................................................. 11-072073

(51) Int. Cl.[7] .................................................. H01R 35/04
(52) U.S. Cl. ............................................................ 439/164
(58) Field of Search ........................................ 439/164, 15

(56) References Cited

U.S. PATENT DOCUMENTS

| 5,593,310 | 1/1997 | Kawamoto | 439/164 |
| 5,683,260 | 11/1997 | Kato et al. | 439/164 |
| 5,741,145 | * 4/1998 | Kikkawa et al. | 439/164 |
| 5,766,019 | * 6/1998 | Matsumoto et al. | 439/164 |
| 5,871,366 | * 2/1999 | Nishikigi et al. | 439/164 |
| 5,913,488 | 6/1999 | Miho et al. | 439/15 |
| 6,042,405 | * 3/2000 | Masuda et al. | 439/164 |

FOREIGN PATENT DOCUMENTS 6-47882   12/1994   (JP) .

* cited by examiner

Primary Examiner—Gary F. Paumen
(74) Attorney, Agent, or Firm—Brinks Hofer Gilson & Lione

(57) ABSTRACT

A first groove and a second groove are formed deep in the top surface of a stationary housing; the second groove being extended by a given angle circumferentially from both ends of the first groove. A lock screw is threadedly installed to a screw receiving portion of the movable housing, and the movable housing is rotatably connected to the center of the stationary housing. In the housing space defined between the two housings, a flexible cable is wound and housed. The movable housing is positioned in the neutral position of rotation with respect to the stationary housing. This state is kept by engaging the tip of the lock screw with the first groove. To perform rotation tests of the movable housing, the lock screw is turned back up to the position in which the lock screw contacts both ends of the second groove, and the movable housing can be turned within a range of less than ±180 degrees from the neutral position of rotation. After completion of the tests, the lock screw is engaged with the first groove to re-lock the movable housing in the neutral position of rotation.

8 Claims, 4 Drawing Sheets

ROTARY CONNECTOR CAPABLE OF EASY AND RELIABLE RE-LOCKING OF MOVABLE HOUSING IN NEUTRAL POSITION OF ROTATION AFTER ROTATION TEST

BACKGROUND OF THE INVENTION

1. Field of the Invention

The present invention relates to a rotary connector for electrical connection to be performed by using a flexible cable between a pair of rotatably connected housings and, more particularly, to a locking mechanism for holding the housings in the neutral position of rotation until completion of installation of the rotary connector to a steering system of an automobile.

2. Description of Related Art

The rotary connector is roughly comprised of a pair of housing which are rotatably connected, and a flexible cable wound in an annular housing space defined between the housings; both ends of the flexible cable being fixed to the housing and, in this state, electrically led out. When the movable housing is turned clockwise or counterclockwise in relation to the stationary housing, the flexible cable is wound or unwound in the housing space in accordance with the direction of rotation, thereby, in both states, keeping electrical connection between these housings through the flexible cable.

In the rotary connector, the housing on the stationary side is attached to a combination switch which is a stator member of the steering system, and the housing on the movable side is attached to the steering wheel which is the rotor member of the steering system respectively. The rotary connector thus configured is used as a means of electrical connection for an air bag inflator, a horn switch, etc. In this case, the rotary connector is required to turn by about the same amount in either of the clockwise and counterclockwise directions from the neutral position of rotation of the steering wheel. Therefore, there has been known a locking mechanism so adapted as to hold the housing in the neutral position of rotation until installation of the rotary connector to the steering system is completed.

In a locking mechanism of a heretofore known conventional rotary connector, as disclosed in for example Japanese Utility Model Publication No. Hei 6-47882, the locking member made of a synthetic resin is formed unitarily with a remaining fixed portion, a pull-off portion, and a locking piece. Between the remaining fixed portion and the pull-off portion is formed a thin portion. Using this locking member, the housings are locked from free rotation. That is, at the final stage of the rotary connector assembling procedure, the remaining fixed portion of the lock member is held in an engaging hole of one of the housings which are aligned in the neutral position of rotation, and the locking piece of the locking member is locked to a rotation restricting portion of the other housing. Thus the housings are locked from free rotation by the locking member. This state is kept on until immediately before the installation of the rotary connector to the steering system. When the pull-off portion of the locking member is pulled off from the locking piece at the thin portion after the rotary connector is installed to the steering system, the housings are unlocked and the movable housing now becomes rotatable in synchronization with the turning of the steering wheel.

According to the conventional locking mechanism described above, the angle of rotation of the movable housing set in the neutral position of rotation is restricted to prevent free rotation of the housings, thereby holding the housing in the neutral position of rotation. If the angle of rotation of the movable housing thus restricted in the locked state increases large, the locking mechanism will fail to perform its inherent function. In the locked state, therefore, it is necessary to lock the movable housing from turning, or to restrict the angle of rotation to allow rotation only within a narrow range of play. If, in this case, the rotary connector is left as locked, various tests can not be conducted by turning the movable housing.

For example, there has recently been adopted such an operation procedure that, using the rotary connector and a combination switch which are integrally formed prior to installing these components to the steering system, a canceling mechanism of the combination switch is operated by means of the turning force of the movable housing of the rotary connector. In this case, if both housings of the rotary connector are held in the locked state by using the conventional locking mechanism previously stated, it will become impossible to test whether or not the canceling mechanism normally operates. The canceling mechanism functions to automatically return to the center position the operating lever of a headlamp switch provided in the combination switch. In the case when the canceling lever of the canceling mechanism is projected into the range of canceling turn provided in the movable housing, the canceling lever is driven with the rotation of the movable housing in interlock with the steering wheel, thereby allowing the operating lever to automatically return from the right or left position of operation to the center position when the steering wheel is turned to the neutral position.

SUMMARY OF THE INVENTION

The rotary connector of this invention is provided with a locking means which can restrict the rotation of the movable housing in the locked state, within a wider range of angle of rotation than that in the vicinity of the neutral position of rotation of the movable housing. According to the locking means, the housings are unlocked in the vicinity of the neutral position of rotation, so that the rotation test of the movable housing can be conducted. In this case, the rotation of the movable housing is restricted within one turn from the center in the neutral position of rotation, and therefore the movable housings can easily and reliably be re-locked in the neutral position of rotation.

To be more specific, the rotary connector of this invention is provided with a stationary housing, a movable housing rotatably connected to the stationary housing through a housing space, and a flexible cable wound within the housing space and electrically led outside of both the stationary and movable housings, and is designed to selectively check, by a locking means, free rotation of the movable housing in relation to the stationary housing. In rotary connector, the locking means is configured so as to have a first locking portion for restricting rotation of the movable housing in the vicinity of the neutral position of rotation of the movable housing, and a second locking portion for restricting rotation of the movable housing within a range of less than ±180 degrees from the neutral position of rotation thereof.

According to the above-described configuration, the movable housing, when unlocked by the first locking portion, is restricted by the second locking portion from turning within the range of less than ±180 degrees from the neutral position of rotation. Within this range of angle, the movable housing can be turned to conduct various checks and tests. In this case, since the movable housing will not turn more than one rotation from the neutral position of rotation, it is possible to easily and reliably re-lock the movable housing by the first locking portion in the neutral position of rotation.

It should be noticed that the locking means may be made in various modifications and changes; for example, a first groove and a second groove circumferentially extending from both ends of the first groove may be formed in either one of the stationary and movable housings, and furthermore there may be provided, in the other housing, a locking member which can be engaged with, and disengaged from, the first and second grooves. The first locking portion may be comprised of the first groove and the locking member, while the second locking portion may include the second groove and the locking member. In this case, the angle of rotation of the movable housing to be restricted can be changed in accordance with the distance between the locking member and the bottom surface of the second groove by setting the depth of the second groove so that the depth will gradually decrease as it goes far away from the first groove.

Furthermore, as another modification the locking means may be constituted as follows: a recess portion and a projecting portion are provided at a given interval in a circumferential direction in one of the stationary and movable housings, and a lock screw capable of engaging with, and disengaging from, the recess portion and the projecting portion is supported in the other housing, thereby constituting the first locking portion of the recess portion and the lock screw, and the second locking portion with the projecting portion and the lock screw.

Furthermore, it is desirable that the rotary connector to be installed to the steering system be preinstalled integrally with the combination switch. In this case, the stationary housing is fixed to the combination switch casing and also the canceling mechanism attached to the combination switch is operated by the rotation of the movable housing, so that the rotary connector formed integral with the combination switch can be tested to see if the canceling mechanism normally operates. After completion of the test procedure, the movable housing can easily and reliably be re-locked in the neutral position of rotation by the first locking portion.

The above and other objects, features and advantages of the present invention will be clearer from the following description with reference to the accompanying drawings.

DESCRIPTION OF THE PREFERRED EMBODIMENTS

Figure 1:
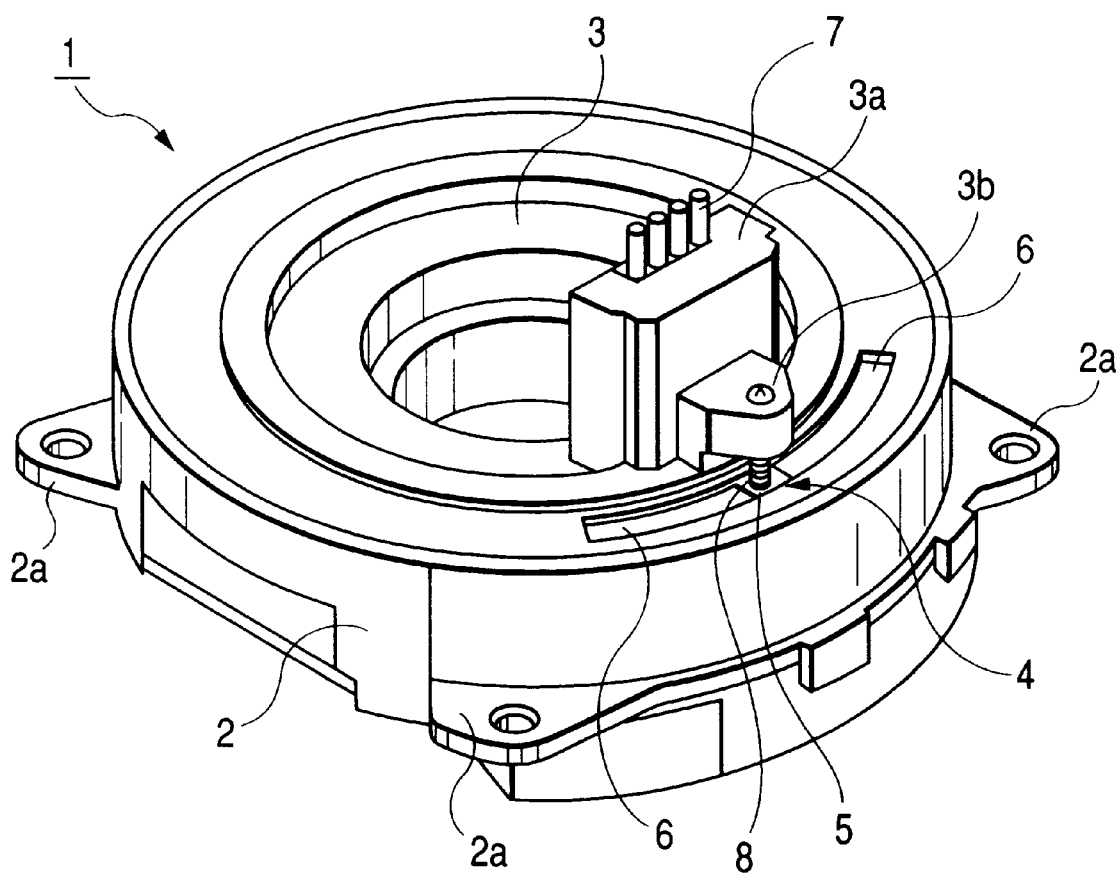
FIG. 1 is a perspective view of a rotary connector of an embodiment according to this invention.
Figure 2:
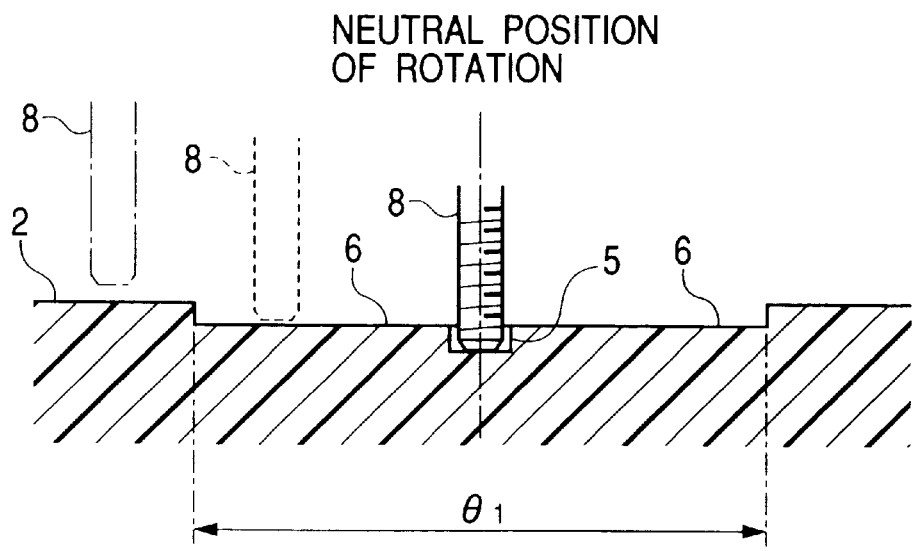
FIG. 2 is an explanatory view of a locking means.

Preferred embodiments of a rotary connector according to this invention will be described with reference to the accompanying drawings, in which FIG. 1 is a perspective view of the rotary connector, and FIG. 2 is an explanatory view of a locking means of the rotary connector.

As shown in FIG. 1, the rotary connector 1 of the present embodiment is comprised of a stationary housing 2 having a plurality of mounting lugs 2a, a movable housing 3 rotatably connected in an unillustrated annular housing space at the center of the stationary housing, an unillustrated flexible cable wound in this housing space, and a locking means 4 for restricting the angle of rotation of the movable housing 3 with respect to the stationary housing 2.

The stationary housing 2 is molded of a synthetic resin. Supported on a leg portion 2b protruding from the bottom of the stationary housing 2 is an unillustrated direct connector which is connected to one end of the flexible cable. In a top surface of the stationary housing 2, there are formed a first groove 5 which is narrow in width and a second groove 6 extending by a given angle (e.g., about 90 degrees) within 360 degrees in the circumferential direction. The first groove 5 is located nearly at the center of the second groove 6. As shown in FIG. 2, the depth of the first groove 5 is set larger than the second groove 6, which is extended horizontally from both ends of the first groove 5.

The movable housing 3 also is produced of a synthetic resin by molding. A lead block 7 connected to the other end of the flexible cable is supported on the holding body 3a projecting from the top surface of the movable housing 3. A screw receiving portion 3b is unitarily formed on the outside surface of the holding body 3a. The locking means 4 is constituted of a lock screw 8 screwed in the screw receiving portion 3b and the first and second grooves 5 and 6. The lock screw 8 is capable of moving up and down along the axis by a turning operation. The tip of the lock screw 8, at the lowermost position, is engaged with the first groove 5 as indicated by the solid line in FIG. 2, and, at the uppermost position, off the top surface of the stationary housing as indicated by a two-dot chain line in the same drawing, and, in the midpoint position, can come into contact with both ends of the second groove 6 as indicated by a chain-dot line. The first locking portion consists of the first groove 5 and the lock screw 8, while the second locking portion, of the second groove 6 and the lock screw 8.

In the rotary connector 1 thus configured, the stationary housing 2 is attached on the combination switch which is a stator member of the steering system, and the movable housing 3 is attached on the steering wheel which is a rotor member of the steering system. The rotary connector 1 is used as a means for electrical connection of an air back inflator, a horn switch, and others mounted on the steering wheel. In this case, the rotary connector 1 has to be able to turn by nearly an equal amount in either of the clockwise and counterclockwise directions from the neutral position of rotation of the steering wheel. Accordingly, at the stage of completion of assembling the rotary connector 1, themovable housing 3 is set in the neutral position of rotation with respect to the stationary housing 2, then the lock screw 8 is tightened fully to the lowermost position into engagement with the first groove 5. Consequently, the movable housing 3 is checked from turning by the engagement of the lock screw 8 with the first groove 5 and therefore will not accidentally turn on the way of transport of the rotary connector 1; that is, the rotary connector 1 can be kept just in a factory-set state until immediately before installation to the steering system.

When the movable housing 3 requires a rotation test after setting in the neutral position of rotation, the lock screw 8 is loosened a little up the midpoint position indicated by a chain-dot line in FIG. 2. In this state the movable housing 3 can be turned until the lock screw 8 comes into contact with both ends of the second groove 6. Therefore, it is sufficient to conduct the required rotation test of the movable housing 3 within the range of angle ($\theta1 \approx 90$ deg.). At this time, because the movable housing 3 is restricted by the second groove 6 from turning over one rotation from the neutral position of rotation, the movable housing 3 can easily and reliably be re-locked in the neutral position of rotation by engaging the lock screw 8 in the first groove 5 after the test. When the rotary connector 1 is installed to the steering system, the lock screw 8 is loosened as high as the uppermost position indicated by the two-dot chain line in FIG. 2; in this position the lock screw 8 is not engaged in either of the first groove 5 and the second groove 6. Therefore, the movable housing 3 is fully unlocked and now is ready to be turned synchronously with the turning of the steering wheel.

Figure 3:
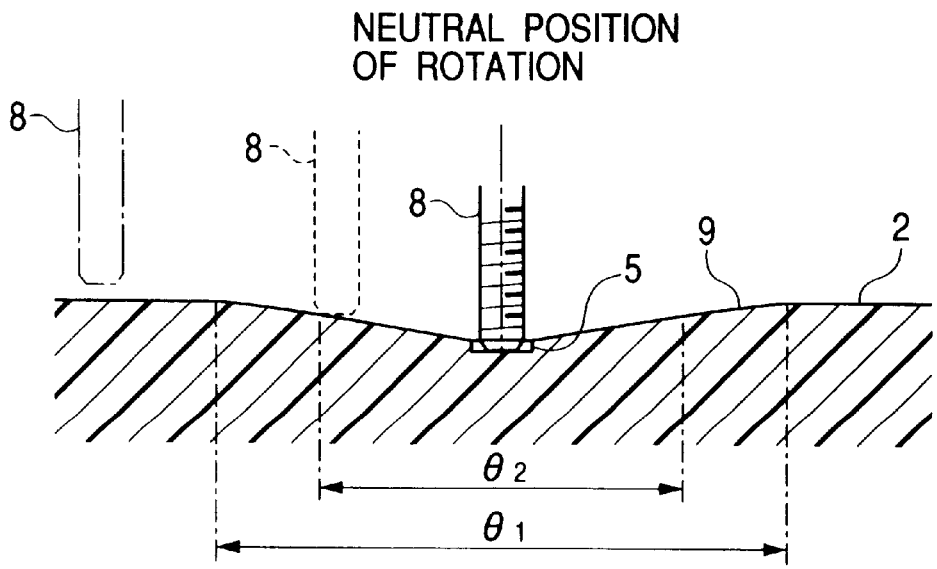
FIG. 3 is an explanatory view showing a modification of the locking means.

In the embodiment shown in FIG. 3, the second groove 9 extended circumferentially from both ends of the first groove 5 is tapered and the depth of this second groove 9 is gradually decreased as it goes away from the first groove 5. Since the second groove 9 has a tapered bottom surface, the contact position between the tip of the lock screw 8 and the bottom surface of the second groove 9 varies in accordance with the amount of projection of the lock screw 8, thereby enabling the angle of rotation of the movable housing 3 restricted by the second locking portion to freely change within the range of the maximum angle θ1. That is, for instance when the lock screw 8 protrudes to a position indicated by the chain-dot line in FIG. 3, the rotation of the movable housing 3 is restricted within the range of the angle θ2. When the amount of projection of the lock screw 8 is increased, the rotation of the movable housing 3 is restricted to the range of smaller angle than the angle θ2; reversely, when the amount of projection of the lock screw 8 is decreased, the rotation of the movable housing 3 is restricted to the range of larger than the angle θ2 and smaller than the angle θ1.

Figure 4:
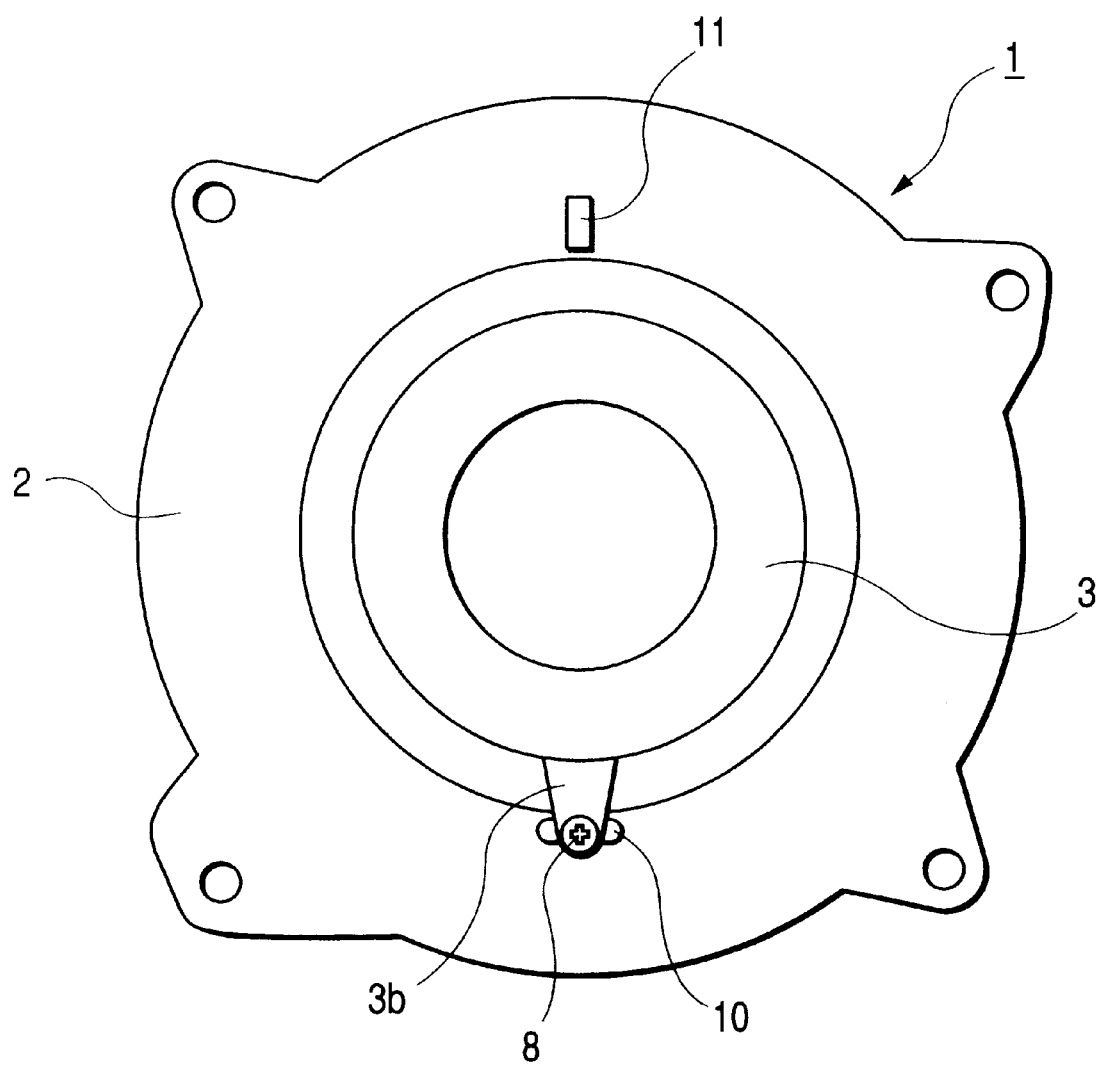
FIG. 4 is a plan view of the rotary connector of another embodiment of this invention.

In the embodiment shown in FIG. 4, a recess portion 10 and a projecting portion 11 are formed circumferentially at a specific spacing (e.g., at an about 180 deg. spacing)on the top surface of the stationary housing 2. The first locking portion is composed of the recess portion 10 and the lock screw 8 screwed in the screw receiving portion 3b of the movable housing 3, and the second locking portion is composed of the lock screw 8 and the projecting portion 11.

In the case of the present embodiment, after the movable housing 3 is aligned with the neutral position of rotation with respect to the stationary housing 2 at the stage of completion of assembling of the rotary connector 1, the lock screw 8 is tightened to insert the tip thereof into the recess portion 10, to thereby restrict the rotation of the movable housing 3 within a range of a slight amount of play between the lock screw 8 and the recess portion 10. This state can be kept until immediately before installation of the rotary connector to the steering system. When the rotation test of the movable housing 3 is required, the lock screw 8 is turned back up to the position in which the tip thereof is off the recess portion 10; in this state, the movable housing 8 can be turned to a position where the lock screw 8 comes into contact with the projecting portion 11. It is, therefore, advisable to conduct necessary tests by turning the movable housing 3 within the range of angle (±about 180 deg.). At this time, the movable housing 3 is restricted by the projecting portion 11 from turning over one turn from the neutral position of rotation, and therefore it is possible to easily and reliably re-lock the movable housing 3 in the neutral position of rotation by tightening the lock screw 8 to insert its tip into the recess portion 10 after completing the above-described test. When the rotary connector 1 is to be mounted to the steering system, the lock screw 8 is loosened off the screw receiving portion 3b, and accordingly will not engage with either of the recess portion 10 and the projecting portion 11.

Therefore, the movable housing 3 is fully unlocked and can be turned in connection with the manipulation of the steering wheel.

Figure 5:
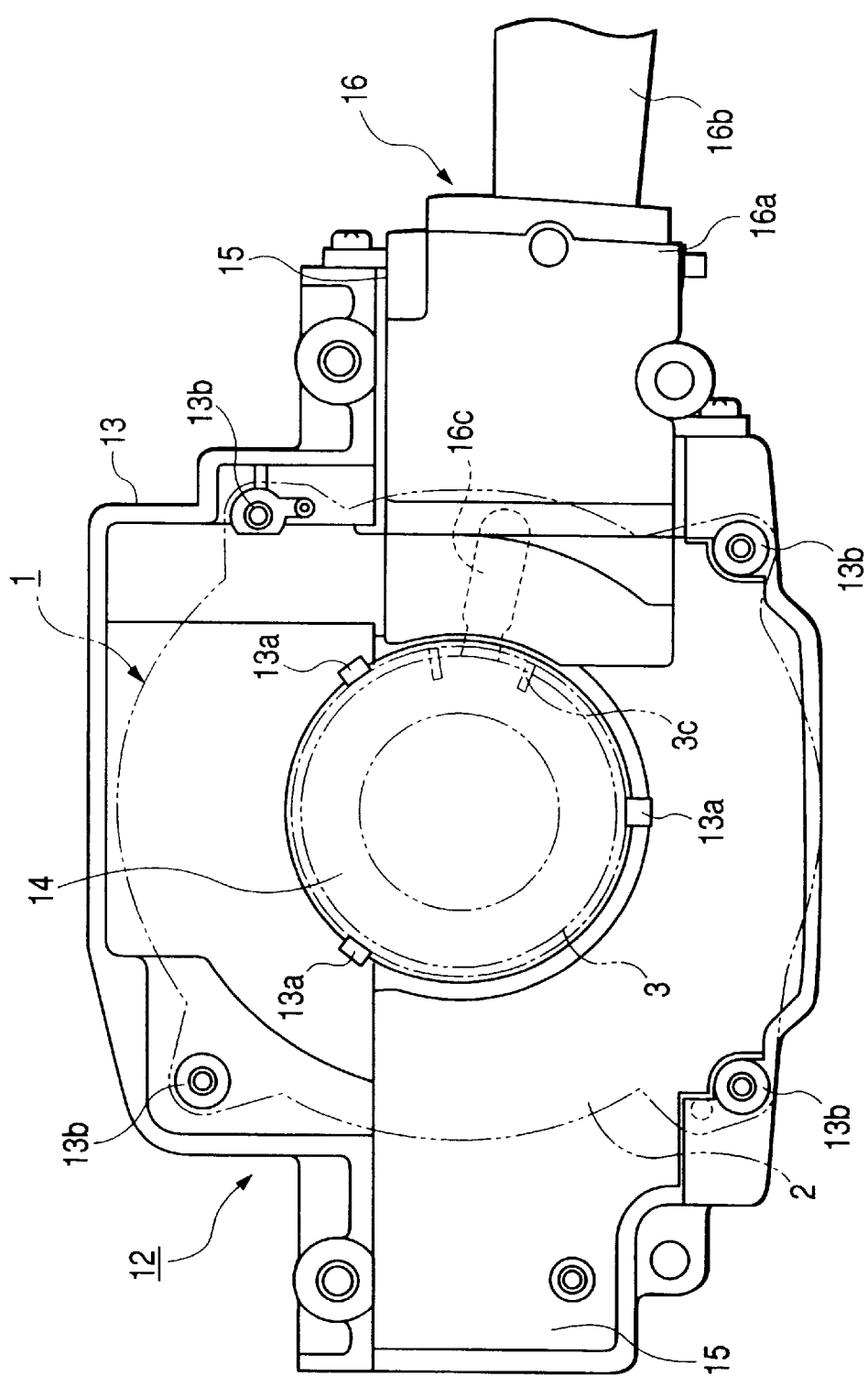
FIG. 5 is a plan view showing a rotary connector and combination switch unit of another embodiment.

In the embodiment shown in FIG. 5, the rotary connector 1 is assembled into one unit with the combination switch 12 in advance, then the unit of the rotary connector 1 and the combination switch 12 thus assembled is mounted to the steering system. The combination switch 12 has a cabinet 13 which forms a shell for the combination switch 12 and is provided with three guide portions 13a and a plurality of posts 13b arranged at an equal spacing of about 120 degrees on the cabinet 13. An insertion hole 14 is defined inside of the guide portion 13a, and right and left holding portions 15 are oppositely formed through the insertion hole 14. On one of the holding portions 15 the base portion 16a of the headlamp switch 16 is fixed, and an operating lever 16b for operating the right and left turn signal lamps and passing lamps is supported on the base portion 16a. In the base portion 16a such known mechanisms as a locking mechanism for locking the operating lever 16b in the right and left positions of operation and a canceling mechanism for self-canceling the operating lever 16b from the operating position to the center position are built. The forward end of the canceling lever 16c which is a component part of the canceling mechanism protrudes into the insertion hole 14. On the other holding portion 15 an unillustrated wiper switch is mounted.

In the rotary connector 1 of the present embodiment, a canceling projection 3c for operating the later-described canceling mechanism is formed on the lower end of the movable housing 3 protruding out of the bottom surface of the stationary housing 2. When installing the rotary connector 1 in the combination switch 12 of the above-described configuration, the movable housing 3 is first locked in the neutral position of rotation by means of the first locking portion previously stated, and then each of the mounting lugs 2a of the stationary housing 2 is screwed into a corresponding post 13b of the cabinet 13. At this time, the lower part of the movable housing protruding out of the bottom surface of the stationary housing is inserted into each guide portion 13a, so that, in the insertion hole 14, the canceling projection 3c is positioned oppositely to the forward end of the canceling lever 16c. To conduct a test to see if the canceling mechanism in this state properly operates, the first lock of the rotary connector 1 is unlocked to operate the second lock as previously stated, to restrict the movable housing 3 from turning within the range of less than ±180 degrees from the neutral position of rotation. It is possible therefore to conduct the test, by turning the movable housing 3 within this range of angle, to see if the canceling projection 3c actuates the canceling lever 16c. After the completion of this test procedure, the movable housing 3 can easily and reliably be re-locked by the first lock in the neutral position of rotation.

Thereafter the unit assembly of the rotary connector 1 and the combination switch 12 is installed to the steering system; the cabinet 13 of the combination switch 12 is fixed to a suitable stator member of the steering system; and with the first and second locks of the rotary connector 1 unlocked, the movable housing 3 is connected to the steering wheel.

In the above-described embodiment, the rotary connector using the locking means and lock screw has been explained. It, however, should be noted that the locking means of this invention is not limited thereto; for example a locking member movable by sliding operation to the locking position may be adopted.

The rotary connector of the above-described embodiment according to this invention has the following advantages.

The locking means for restricting the free rotation of the movable housing in relation to the stationary housing is so configured as to have the first lock for restricting the rotation of the movable housing in the vicinity of the neutral position of rotation and the second lock for restricting the rotation of the movable housing within the range of less than ±180 degrees from the neutral position of rotation. In this state, the movable housing is unlocked in the vicinity of the neutral position of rotation to enable rotation tests. In this case the rotation of the movable housing is restricted within one turn from the neutral position of rotation as a reference point, and therefore it is possible to easily and reliably re-lock the movable housing in the neutral position of rotation.

What is claimed is:

1. A rotary connector comprising: a stationary housing; a movable housing rotatably connected to the stationary housing through a housing space; and a flexible cable wound inside of the housing space and electrically led out of the stationary and the movable housings, the free rotation of the movable housing in relation to the stationary housing being selectively checked by a locking means;

the locking means having a first locking portion for restricting a first angle of rotation of the movable housing in the vicinity of a neutral position of rotation thereof, and a second locking portion for restricting a second larger angle of rotation of the movable housing within a range of less than ±180 degrees from the neutral position of rotation thereof.

2. The rotary connector according to claim 1, wherein any one of the stationary housing and the movable housing is provided with a first groove and a second groove extended circumferentially from ends of the first groove, and the other housing is provided with a locking member which can be engaged with, and disengaged from, the first and the second grooves; the first locking portion being comprised of the first groove and the locking member, and the second locking portion being comprised of the second groove and the locking member.

3. The rotary connector according to claim 2, wherein a depth of the second groove is gradually decreased as it goes away from the first groove.

4. The rotary connector according to claim 1, wherein a recess portion and a projecting portion are circumferentially formed at a given spacing in any one of the stationary housing and the movable housing; and a lock screw which can be engaged with, and disengaged from, the recess portion and the projecting portion, are supported in the other housing; and the first locking portion being comprised of the recess portion and the lock screw, and the second locking portion being comprised of the projecting portion and the lock screw.

5. The rotary connector according to claim 1, wherein the stationary housing is fixedly attached to a combination switch cabinet to which an operating lever having a canceling mechanism is mounted; the canceling mechanism being adapted to be operated by the movable housing.

6. The rotary connector according to claim 2, wherein the stationary housing is fixedly attached to a combination switch cabinet to which an operating lever having a canceling mechanism is mounted; the canceling mechanism being adapted to be operated by the movable housing.

7. The rotary connector according to claim 3, wherein the stationary housing is fixedly attached to a combination switch cabinet to which an operating lever having a canceling mechanism is mounted; the canceling mechanism being adapted to be operated by the movable housing.

8. The rotary connector according to claim 4, wherein the stationary housing is fixedly attached to a combination switch cabinet to which an operating lever having a canceling mechanism is mounted; the canceling mechanism being adapted to be operated by the movable housing.

* * * * *